No. 663,058. Patented Dec. 4, 1900.
A. W. WILTSIE & E. J. CAMPBELL.
CATTLE STANCHION.
(Application filed Sept. 9, 1899.)
(No Model.)
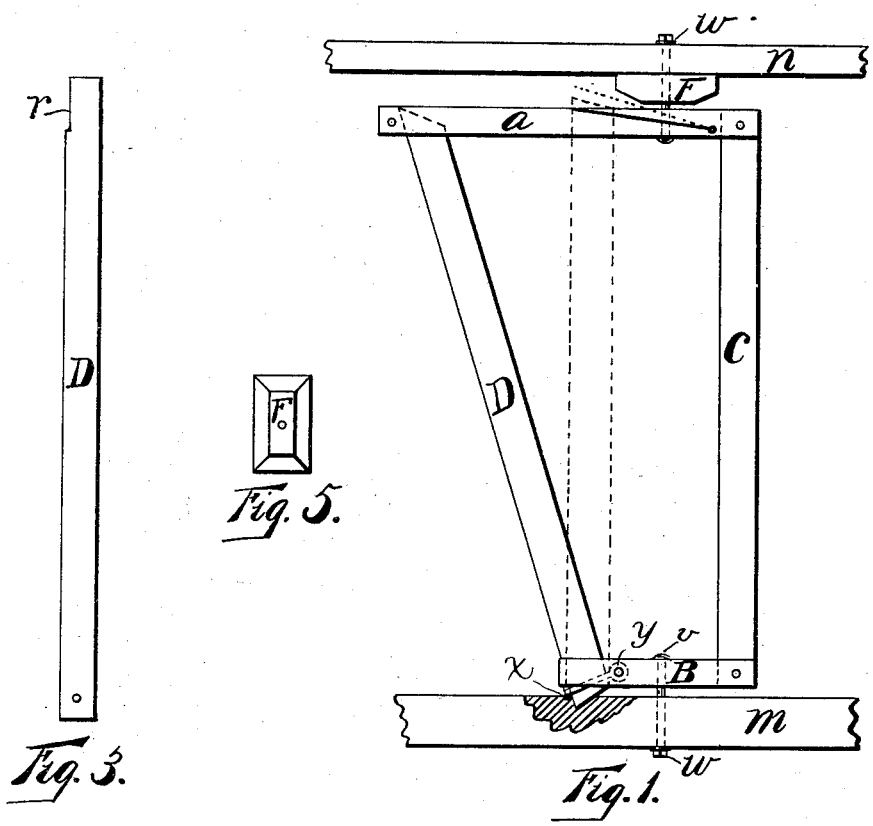

UNITED STATES PATENT OFFICE.

ARTHUR W. WILTSIE AND EDWIN J. CAMPBELL, OF HANNIBAL, NEW YORK.

CATTLE-STANCHION.

SPECIFICATION forming part of Letters Patent No. 663,058, dated December 4, 1900.

Application filed September 9, 1899. Serial No. 730,042. (No model.)

*To all whom it may concern:*

Be it known that we, ARTHUR W. WILTSIE and EDWIN J. CAMPBELL, citizens of the United States, residing in Hannibal, county of Oswego, State of New York, have invented a new and useful Cattle-Stanchion, of which the following is a specification.

This invention is intended as an improvement on the class of stanchions that swivel or are movable about vertical pivots. One bar is movable away from the other to open the stanchion. When this is returned to its upright position, it locks automatically, leaving the stanchion to turn freely on its pivots.

This improvement is fully set forth in the following specification, reference being had to the accompanying drawings.

Figure 1 represents a stanchion embodying our invention in front elevation, a small portion being in section. Fig. 2 is a top view of the headpiece A with spring in position. Fig. 3 is an edge view of the movable bar D, showing shoulder r to prevent headpiece A from sagging when stanchion is locked. Fig. 4 is a top view of bottom piece. Fig. 5 is a view of block F as seen from beneath.

In the accompanying drawings, m represents a base plate or beam spiked or otherwise fastened to the floor.

n represents an upper cross-head, also rigidly fastened to the stable.

A represents the top bar of the stanchion provided with a slotted extension o to guide the movable bar D when opening or shutting the stanchion, and B is the lower cross-head of the stanchion.

The upper cross-head A and the lower cross-head B are rigidly fastened to the upright bar C. Through lower end of the movable bar D passes the eyebolt x, through the eye of which passes the bolt y, thus securing a pivotal attachment between the movable bar D and the lower cross-head B outside of bar D in such a manner as to allow the lower end of bar D to drop into a mortise or recess in base-plate m when the stanchion is opened, thus preventing the stanchion from rotating when open.

On the upper side and near the rigid end and front side of bar A is fastened the spring z, which extends toward the slotted end of bar A, thence across to the back side and slightly beyond, then curves backward, and is fastened to the rear side of bar A. By being placed on the upper surface of the bar A it can never be raised by the horns of the cattle, yet the attendant may easily raise it by the finger-piece r at the rear. The block F is rigidly fastened to the upper cross-bar n, through which passes the double-nutted bolt w with head downward. The pin v passes through the lower cross-head B and into the base-plate m.

Connected to the top of the upper cross-head A near its front edge is a wire catch s, which is preferably bent, as shown in Fig. 2, and which catch rests upon the top of the cross-head, as shown. This wire is bent, as shown at t, so as to form a finger-piece, by means of which the operator raises this wire to release the upper end of the upright bar. As this bar swings backward its inclined upper end strikes against the under side of the front end of the catch s and raises it until it drops behind the upper end of the bar, and thus locks it in position. As soon as the operator raises this catch the bar drops forward into position.

We claim as new and desire to secure by Letters Patent—

1. In a stanchion, the base-plate having a recess formed in its top, the top and lower cross bars or rods of the stanchion, suitable pivots upon which the stanchion turns, and the upright bar C connecting the ends of the top and bottom bars, and a swinging attachment connected to the lower cross-head, and by means of which the bar is connected to the cross-head and is given a vertical movement or play, whereby when the bar is moved into a vertical position its end is withdrawn from the recess in the base-plate, substantially as shown.

2. In a cattle-stanchion, the stationary frame having a socket in its base portion, a movable frame pivotally mounted on a vertical axis in the stationary frame, and comprising upper and lower bars having vertically-alined openings and connected rigidly by an upright stanchion-bar, a movable stanchion-bar having reversely-beveled ends projecting through the openings in the upper and lower bars, and pivotally connected to the lower bar of the movable frame, and projecting therethrough for engagement with the socket, and a latch-bar engaging the free end of the pivoted stanchion; the parts being so arranged that when the movable stanchion-bar is swung inward, the movable frame is free to turn, and when said stanchion is moved outward its lower end engages the socket in the base of the stationary frame and serves to lock the movable frame, substantially as set forth.

A. W. WILTSIE.
E. J. CAMPBELL.

Witnesses:
J. R. CHAMBERLAIN,
C. N. DOXTATER.